(12) United States Patent
Aarhus

(10) Patent No.: US 8,337,161 B2
(45) Date of Patent: Dec. 25, 2012

(54) BLADE ROOT EXTENDER FOR A WIND TURBINE

(75) Inventor: Karl Aarhus, Silkeborg (DK)

(73) Assignee: Gamesa Innovation & Technology, S.L., Sarriguren (Navarra) (ES)

(*) Notice: Subject to any disclaimer, the term of this patent is extended or adjusted under 35 U.S.C. 154(b) by 622 days.

(21) Appl. No.: 12/575,593

(22) Filed: Oct. 8, 2009

(65) Prior Publication Data

US 2010/0098552 A1    Apr. 22, 2010

(30) Foreign Application Priority Data

Oct. 16, 2008  (ES) .................................. 200802915

(51) Int. Cl.
*B64C 11/04* (2006.01)
(52) U.S. Cl. .................................. 416/204 R
(58) Field of Classification Search ............. 416/204 R, 416/248, 146 R
See application file for complete search history.

(56) References Cited

U.S. PATENT DOCUMENTS 1,939,065 A * 12/1933 Kruse .............................. 72/312
6,957,588 B1 * 10/2005 Kicher et al. ............... 73/861.52

FOREIGN PATENT DOCUMENTS

| FR | 2 863 318 A1 | 6/2005 |
| WO | WO 0142647 A2 * | 6/2001 |
| WO | 03/060319 A1 | 7/2003 |

OTHER PUBLICATIONS

Espacenet English abstract of FR 2 863 381 A1, translated Jul. 31, 2012.

* cited by examiner

*Primary Examiner* — Edward Look
*Assistant Examiner* — Adam W Brown
(74) *Attorney, Agent, or Firm* — Ladas & Parry LLP

(57) ABSTRACT

A blade root extender for a wind turbine assembled between the blade root and a hub fixed to the wind turbine's nacelle. The extender is made up of a hollow, corrugated cylinder and one or two terminal flanges with holes for some preloaded stud bolts that apply pressure to the blade root extender.

7 Claims, 2 Drawing Sheets

BLADE ROOT EXTENDER FOR A WIND TURBINE

FIELD OF THE INVENTION

This invention is related to the horizontal shaft's wind turbines and more specifically to the use of blade extenders connected between the wind turbine's blade root and blade bearing or hub, increasing the sweep area of the blades and increasing energy production.

BACKGROUND OF THE INVENTION

Blade root extenders are used to increase the rotor diameter of a wind turbine generator in order to use an existing blade on turbines situated in locations where the wind class is lower than the basic design wind class for the blade (and wind turbine). The increased rotor diameter increases the blade sweep area and consequently increases the wind turbine's electric power production.

The blade extenders are generally made out of metal in a welded or cast design. Such extenders have two bolt circles: one for blade connection and the other for bearing (or hub) connection, therefore including two screwed flanges and one cylinder between them that works as a separator.

In principle, this type of extender can also be manufactured in composite, such as plastic reinforced with fibreglass or reinforced with carbon fibre, as indicated in WO0142647, showing the design of an extender that increases the blade length and which, like the blade, is made out of composite.

Further using an extender could facilitate a blade angle change, like in WO03060319 where the angle between the tower axis and the rotor circular area is modified to avoid collision between blade tip and tower in case of strong winds. The blade angle in circumferential direction could also be changed as seen in FR2863318.

Several wind turbine manufacturers have suggested or used a design with long stud bolts with two concentric cylinders made out of longitudinally welded steel plate. The bolts are in the one end connected to the blades and in the other end is clamping the bearing inner ring.

However, given that the wind turbine blades, and therefore the extenders, are subjected to severe fatigue loads, they should be correctly designed so that the use of long prestressed bolts ensures that the extender is never subjected to traction loads, considerably increasing the fatigue resistance of the extender. The compression load on the cylinders leads however to the presence of tensile hoop stresses in the cylinder, which must be considered.

The blade root extender does however not contain a circumferential weld for the assembly of the extender. The circumferential weld is typically the weakest point in the design when considering fatigue.

On the other hand, due to the compression preload from the bolts the wall thickness of the cylinder is defined by either the buckling strength of the cylinders or the compressive strength of the material.

SUMMARY OF THE INVENTION

The invention proposes a wind turbine blade root extender that thanks to its construction and functional characteristics provides high buckling resistance at the same time as a lighter design, which is an advantage compared to conventional solutions.

This blade root extender is made up of a corrugated cylinder with, at least at one of its ends, a flange with holes to insert prestressed bolts for the coupling of the extender between the blade root and the blade bearing or wind turbine hub.

The corrugated extender may preferably be produced as a continuous seamless tube (extruded or protruded) or a riveted tube with bends for each peak and trough.

The fact that this cylinder is corrugated means an increase in the extender's resistance to buckling due to the corrugated cylinder's greater strength against local bending compared to conventional solutions such as the two longitudinally welded cylinders described above.

The stud bolts shall be located on a bolt circle diameter which lies between the peak and troughs defined by the cross section of the corrugated cylinder. The cross section of the cylinder shall be made such that the compressive stiffness on both side of the bolt circle diameter is the same in order not to induce unnecessary bending in the cylinder and bolts.

DESCRIPTION OF THE PREFERRED INSTALLATION

Figure 1:
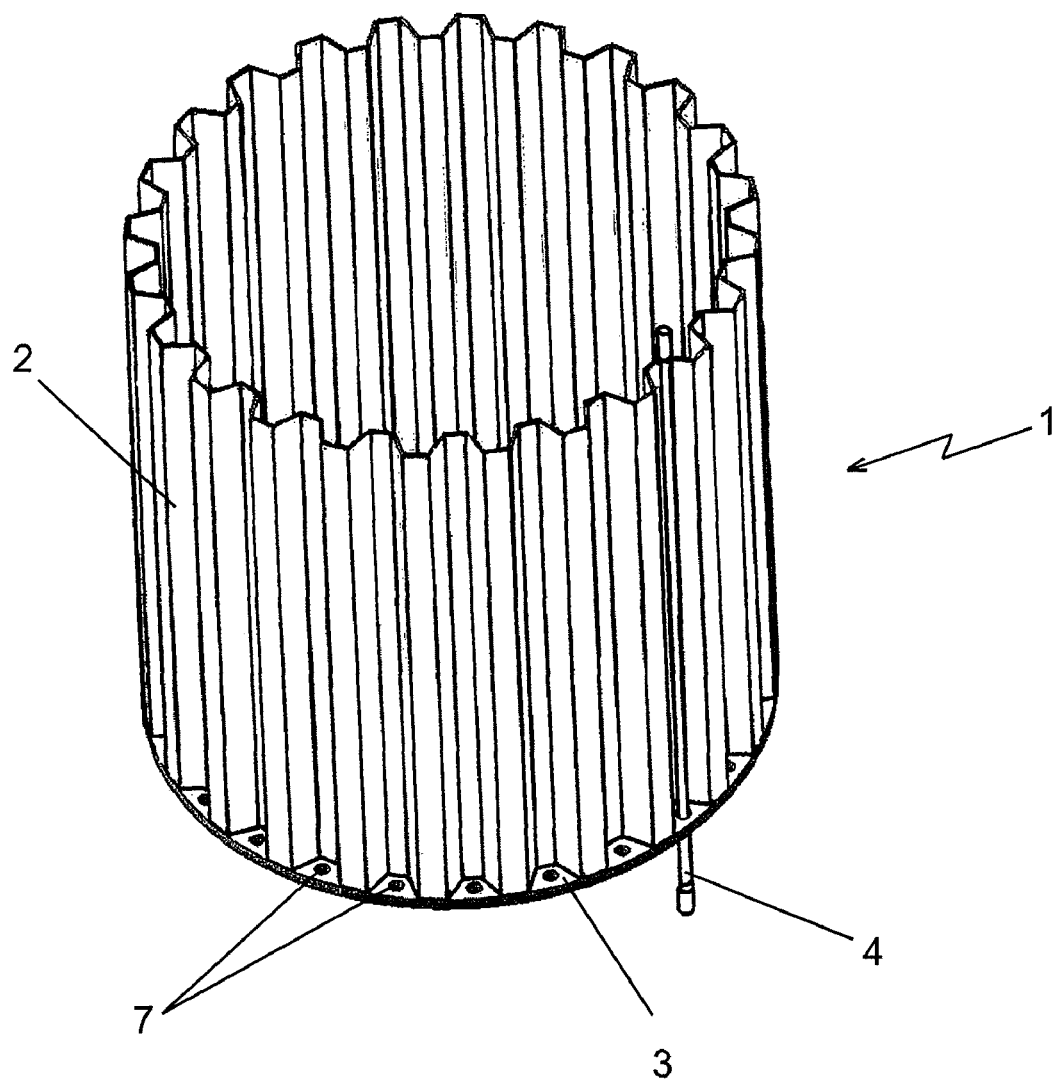
FIG. 1 shows a perspective of an extender according to the field of the invention.

The invention proposes using an extender (1) made up of a corrugated cylinder (2) with a least one fixing flange (3) to screw some extender (1) preloaded fixing bolts (4) between the blade root (5) and the hub's (8) blade bearing (6).

The extender (1) is a hollow, corrugated metal cylinder (2) which has a flange (3) in at least one of its ends. The flanges have a number of holes (7) corresponding to the peak and troughs of the corrugated cylinder, which again corresponds to the number of bolt (4) holes in the blade root (5). The flanges (3) may be made as a cast part or from welded circular sections. The flanges have a trail corresponding to the corrugated cylinder cross section in order to define the relative position of the flanges with respect to each other when the extender is assembled. This trail is useful for minimising eccentricities in the assembly.

Figure 2:
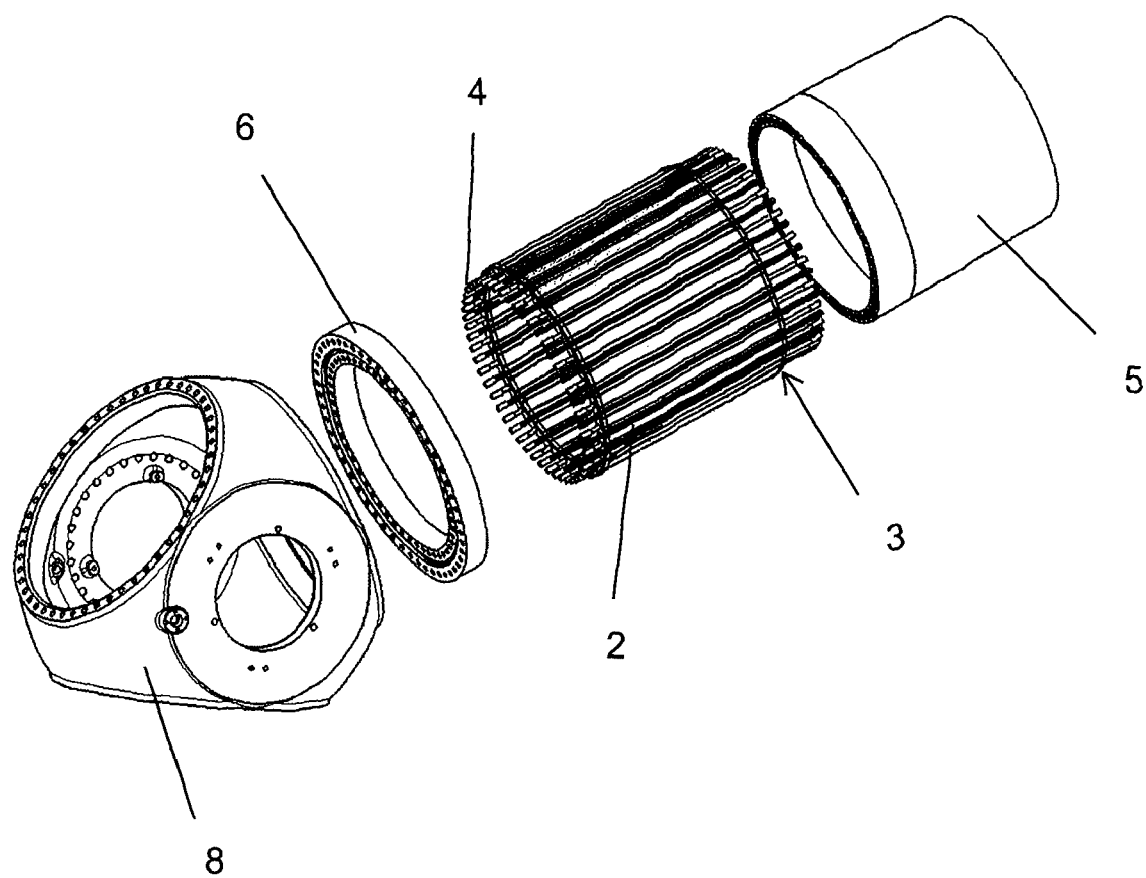
FIG. 2 shows an exploded perspective of the layout of the hub assembly, blade bearing, extender, stud bolts and blade root assembly.

As shown in FIG. 2, the assembly unit made up by the blade root (5), extender (1), blade pitch bearing (6), is assembled by screwing the long stud bolts (4) into the blade root (5). Immediately afterwards, the outer extender flange (3) pushed along the bolts (4) and then the corrugated cylinder is pushed along the bolts (4) until in contact with the flange (3). The extender assembly is completed by installing the second flange (3) on the bolts (4). Then the blade bearing (6) is assembled on the bolts (4). Finally, the blade pitch system parts are assembled, and fixed on the entire assembly with nuts in the stud bolts (4).

By this assembly the weakness of the circumferential weld used in the solutions of the prior art is avoided The complete assembly is then assembled on the rotor hub (8) with the fixed blade bearing ring (6) and the blade bearing (6) hub bolts (8). The assembling of the complete extender assembly to the rotor may take place on the ground or when the hub (8) is installed on the main shaft of the nacelle on the tower.

The stud bolts (4) should be preloaded during installation using a hydraulic tensioner.

The invention claimed is:

1. A blade root extender for a wind turbine, assembled between a root of a blade and a blade pitch bearing or hub and fixed with stud bolts, comprising:

a hollow corrugated cylinder with a flange in at least one of its ends which during installation is tightened with stud bolts which compress the extender, wherein the stud bolts are located on a bolt circle diameter which lies between peak and troughs defined by the cross section of the corrugated cylinder.

2. The blade root extender for a wind turbine according to claim 1, wherein the corrugated cylinder is made of metal.

3. The blade root extender for a wind turbine according to claim 1, wherein the corrugated cylinder is made of a composite material.

4. The blade root extender for a wind turbine according to claim 1, wherein the at least one flange is made as a cast part or from welded circular sections.

5. The blade root extender for a wind turbine according to claim 1, wherein the at least one flanges has a trail corresponding to the corrugated cylinder cross section in order to define the relative position of the flanges with respect to each other when the extender is assembled and there are at least two flanges.

6. The blade root extender for a wind turbine according to claim 1, wherein the assembly between the blade root, the extender, and the blade pitch bearing comprises the steps of:
 a) screwing the long stud bolts into the blade root;
 b) pushing the bolts into an outer extender flange;
 c) pushing the bolts into the corrugated cylinder until the corrugated cylinder is in contact with the flange;
 d) assembling on the bolts the blade bearing;
 e) assembling the blade pitch system parts and fixing the entire assembly with nuts on the stud bolts.

7. The blade root extender for a wind turbine according to claim 6, wherein the assembly between the blade root, the extender, and the blade pitch bearing comprises a subsequent step c2) when the blade root extender includes a second flange wherein the extender assembly is completed by installing the second flange on the bolts.

\* \* \* \* \*